US008888304B2

(12) United States Patent
Beckman

(10) Patent No.: US 8,888,304 B2
(45) Date of Patent: Nov. 18, 2014

(54) OPTICAL CONTROL TECHNIQUES

(76) Inventor: Christopher V. Beckman, New York, NY (US)

(*) Notice: Subject to any disclaimer, the term of this patent is extended or adjusted under 35 U.S.C. 154(b) by 87 days.

(21) Appl. No.: 13/468,977

(22) Filed: May 10, 2012

(65) Prior Publication Data

US 2013/0300911 A1 Nov. 14, 2013

(51) Int. Cl.
*G02B 27/00* (2006.01)

(52) U.S. Cl.
USPC ......................................... 359/613; 296/97.2

(58) Field of Classification Search
CPC .......... G02B 1/11; G02B 1/118; G02B 1/111; B82Y 20/00
USPC ........................... 359/601, 613, 237; 296/97.2
See application file for complete search history.

(56) References Cited

U.S. PATENT DOCUMENTS

| | | |
|---|---|---|
| 4,017,168 A | 4/1977 | Brown |
| 4,669,828 A | 6/1987 | Parker |
| 4,693,560 A | 9/1987 | Wiley |
| 4,699,470 A | 10/1987 | Fergason et al. |
| 4,732,456 A | 3/1988 | Fergason et al. |
| 4,749,261 A | 6/1988 | McLaughlin et al. |
| 4,772,102 A | 9/1988 | Fergason et al. |
| 4,789,858 A | 12/1988 | Fergason et al. |
| 4,791,418 A | 12/1988 | Kawahara et al. |
| 4,806,922 A | 2/1989 | McLaughlin et al. |
| 4,893,903 A | 1/1990 | Thakar et al. |
| 4,950,052 A | 8/1990 | Fergason et al. |
| 4,991,940 A | 2/1991 | Dalisa et al. |
| 4,992,201 A | 2/1991 | Pearlman |
| 5,076,668 A * | 12/1991 | Dalisa et al. ................... 349/86 |
| RE33,921 E | 5/1992 | McLaughlin et al. |
| 5,206,747 A | 4/1993 | Wiley et al. |
| 5,216,530 A | 6/1993 | Pearlman et al. |
| 6,056,424 A * | 5/2000 | DiNunzio ..................... 362/490 |
| 6,864,473 B2 * | 3/2005 | Chretien et al. ............ 250/201.1 |
| 6,940,505 B1 * | 9/2005 | Savine et al. ................. 345/423 |
| 7,091,973 B1 * | 8/2006 | Cohen .......................... 345/426 |
| 7,134,707 B2 * | 11/2006 | Isaac ............................ 296/97.6 |
| 7,355,161 B2 * | 4/2008 | Romig et al. ................. 250/221 |
| 7,505,136 B2 * | 3/2009 | Romig et al. ................. 356/432 |
| 7,621,750 B1 * | 11/2009 | Boinard et al. ............... 434/365 |
| 2006/0083004 A1 * | 4/2006 | Cok .............................. 362/330 |
| 2008/0063296 A1 * | 3/2008 | Von Thal et al. ............. 382/274 |
| 2009/0058126 A1 * | 3/2009 | Broude et al. ............... 296/97.2 |
| 2009/0097092 A1 * | 4/2009 | Luebke et al. ................ 359/237 |
| 2009/0168185 A1 * | 7/2009 | Augustine .................... 359/613 |

(Continued)

OTHER PUBLICATIONS

Canon, "Technical Room: Image Stabilizer," retrieved from the internet at http://www.canon.com/camera-museum/tech/room/tebure.html, retrieved on Apr. 4, 2013; 1 page.

(Continued)

*Primary Examiner* — Clayton E LaBalle
*Assistant Examiner* — Warren K Fenwick

(57) ABSTRACT

New optic control systems are provided that manage factors impacting image quality and environmental perception. In some aspects of the invention, a regionally shadable semi-transparent matrix and actuating system is provided, which limits problematic glare for observation points. In additional aspects, light that would exceed a threshold limit of luminance at such observation points is shaded or intercepted, leading to an enhanced image of environmental objects. In other aspects, the system reduces such shading or interception and augments regions of the matrix based on potential dangers or to relay other environmental information.

36 Claims, 10 Drawing Sheets

(56) References Cited

U.S. PATENT DOCUMENTS

| | | | |
|---|---|---|---|
| 2009/0204291 A1* | 8/2009 | Cernasov | 701/36 |
| 2010/0065721 A1* | 3/2010 | Broude et al. | 250/201.1 |
| 2011/0209319 A1* | 9/2011 | Williams | 29/402.01 |

OTHER PUBLICATIONS

John F. Hanaway and Robert W. Moorehead, "Space Shuttle Avionics System," retrieved from the internet at http://archive.org/stream/nasa_techdoc_19900015844/19900015844#page/n0/mode/2up, dated 1989, retrieved on Apr. 4, 2013; 82 pages.

Skerrett, P.J., "Through the Glass, Darkly," Popular Science, vol. 243, No. 1 (Jul. 1993), 5 pages.

Gunther, J.A., "Home Technology, Windows, Stealth Drapes," Popular Science, vol. 244, No. 6 (Jun. 1994), 1 page.

Gunston, B., Spick, M., "Modern Air Combat: The Aircraft, Tactics and Weapons Employed in Aerial Warfare Today," 1983, pp. 42, 66-75, Crescent Books, New York, NY.

Gunston B., Fraes, O., "The History of Fighter Planes," 1999, p. 30, Barron's Educational Series Inc., Hauppauge, NY.

Lancaster, K., "DSLR Cinema: Crafting the Film Look with Video," 2011, pp. 235-245, Focal Press, Burlington, MA.

Nightingale, D., "Practical HDR: A Complete Guide to Creating High Dynamic Range Images with Your Digital SLR," 2009, p. 26, Focal Press, Burlington, MA.

Malkiewicz, K., "Cinematography" Second Edition, 1989, pp. 23-36, Fireside, New York, NY.

Burum, S.H. (Editor), "American Cinematographer Manual: 9th Edition," 2004, pp. 218-232, ASC Press, Hollywood, CA.

Coutard, R., "Reflections: Twenty-One Cinematographers at Work," 2002, pp. 197-206, ASC Press, Hollywood, CA.

Young. H. D., "University Physics, Extended Version with Modern Physics," 1992, pp. 14-25, 83-135, 196-223, 232-250, 256-280, 565-568, 605-632, 636-652, 656-681, 687-707, 712-736, 741-761, 769-797, 804-830, 837-860, 866-885, 917-941, 944-998, 1003-1019, 1022-1041, 1045-1067, 1101-1135, Addison-Wesley Pub.Co., Reading, MA.

* cited by examiner

OPTICAL CONTROL TECHNIQUES

FIELD OF THE INVENTION

The present invention relates to the field of camera and other optic control systems. In particular, the invention relates to new techniques for controlling image shake, glare, exposure differentials that exceed the capabilities of an optical sensor and other related camera and live optics problems. The present invention is not restricted to the field of augmented reality; some of the embodiments do not require a computer system among incorporated hardware. See, e.g., Macmillan Dictionary, entry for "Augmented Reality," accessed Apr. 12, 2012, available at http://www.macmillandictionary.com/buzzword/entries/augmented-reality.html ("the technology of combining real word images, video, etc. with computer-generated information and/or imagery.") However, use of this definition is for explanatory purposes only, and does not state or imply an admission that the definition is prior art.

BACKGROUND

Heads-up displays (or "HUDs") have been in use at least since the 1960s, predominantly in military vehicle applications. HUDs of that nature generally create a read-out of vehicle and navigation-related information on or near a semi-transparent canopy and within in a pilot's natural line of site for observing the environment surrounding the vehicle that he or she is controlling. Often, such HUDs operate by reflecting light off of semi-transparent surfaces and into the pilot's field of vision by an information read-out projector.

Structural stabilizing devices have also been used in conjunction with camera systems for years, and include rolling dollies and the steady-cam, developed by Garrett Brown. Such stabilizing devices create a smooth-follow effect when recording visual information with a camera that is moving over uneven terrain or while in the hands of a vertically oscillating operator—e.g., a person walking—by the use of iso-elastic spring-loaded arms.

SUMMARY OF THE INVENTION

New optic control systems are provided that control and augment camera, user or environmental movement and other optical factors.

Within the context of this application, unless otherwise indicated, the following terms have the specific meaning described herein:

"Actuable" in addition to its ordinary meaning and special meaning in the art, is an adjective meaning that the noun modified by the adjective, such as a device, object, interface or condition, is able to be actuated or controlled (for example, by input), including, but not limited to each of the following: able to be actuated or controlled by external indications or input devices, changed stimulus, movement, and/or communication.

A "Brighter," "Brighter than Average," "Bright Source," or "Bright Light Source," in addition to its ordinary meaning and special meaning in the art, means an object within an observable environment that is a source of light which is of greater luminance per unit of an observer/user's eye's lens, retina or field of vision occupied by the object (including any halo effect) than the average luminance of the environment as a whole as it would impact the user's eye's lens, retina or field of vision if viewed from the same position, or more luminous than the average luminance of a substantial section of the environment, for example, the viewable section or the remainder of the environment other than the source, per unit of an observer/user's eye's lens, retina or field of vision.

"Observation point-destined light," in addition to its ordinary meaning and special meaning in the art, means light that, if passing through a semi-transparent, actuable light-affecting medium and/or matrix, would intersect with a user's eye, eye lens or retina or other observation point if not blocked by the medium or matrix and/or other objects between the medium or matrix and the user's eye or another observation point (location point, area or space at which light is sensed).

DETAILED DESCRIPTION OF THE DRAWINGS

Figure 1:
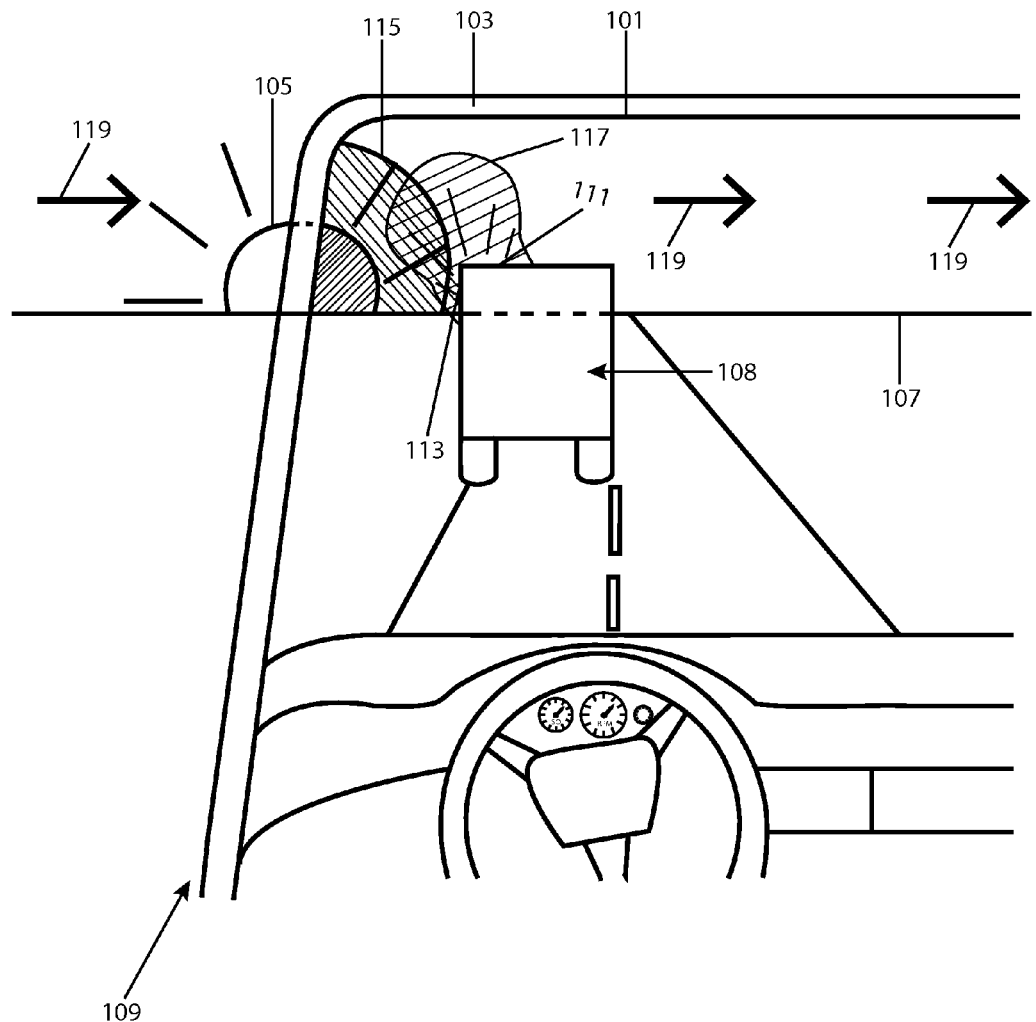
FIG. 1 depicts a vehicle operator's environmental view, as altered and augmented by certain optic conditioning aspects of the present invention, as well as some surrounding environmental factors.

FIG. 1 depicts part of a vehicle operator's environmental view, as augmented by certain optic conditioning aspects of the present invention, as well as some environmental factors surrounding the user. A transparent windshield 101 held within mounting frame 103 allows a motor vehicle driver to view part of an environment surrounding the motor vehicle. Elements of the environment depicted in FIG. 1 include a sun 105 setting into a horizon 107, and a tractor trailer 108 facing away from the user's vehicle, 109. The sun 105 is an original source of non-reflected light that enters the user's field of vision and is brighter (more luminous at the viewer's eyes, eye lenses or retina, or other observation point) than light cast from other objects within the user's field of vision per unit area at the observation point. Reflective surfaces 111 and 113 on the tractor-trailer reflect sunlight through the windshield 101 and into the user's field of vision. As will be explained in greater detail with respect to additional figures, below, a system according to aspects of the present invention, such as a system creating dynamically-shaped and attributed shading, attenuating, augmenting or otherwise directional light-affecting conditions 115 and 117, cause a regional area of the windshield 101 to appear to be shaded for a user of the system, and, preferably, for a user of the system only, reducing the amount of light permitted to enter the user's field of vision after passing through that area while leaving its prior transparency apparently intact for other observers. Furthermore, and as will also will be explained in greater detail with respect to additional figures below, shading conditions 115 and 117 may be placed in, or may have appended to them, leading positions along a user's field of vision, as defined by the direction of movement of brighter (more luminous in terms of candela per area at an observation point) than average, or brighter than another predefined threshold, light sources, such as sources 105, 111 and 113. In the instance of FIG. 1, motion arrows 119 show that some brighter than average light sources within the user's field of view, 105, 111 and 113 (leading to shading), are moving toward the right-hand side of the user's field of vision, due, for example, to the user turning the vehicle left. As a result, additional leading margins to the right-hand side of conditions 115 and 117 may be included to ensure shading and other regional attributes that cover bright increases in light from different angles entering the user's field of vision due to those sources in future instances, despite any lag in region creation or brightness assessment that would occur only from sensing light and creating shading conditions for that light afterwards. Alternatively, or in addition to that approach, the system may assess a probable future location and shift conditions 115 and 117 to regions that will intercept future light from the object that is brighter than the tolerance threshold set by the system and/or user. It should be noted, as will be amplified below, that the system or user may change brightness threshold settings (luminosity levels and ratios for objects and the environment) that will lead to creating shading or augmenting features to optimize system performance and reduce lighting differentials between viewable objects in a user's field of vision according to ambient overall lighting conditions. For example, a lower amount of dynamic shading or other dynamic attributes of conditions 115 and 117 might be used in lower overall light conditions, as may be determined by environmental light sensor(s).

Sources of different brightness and other visual qualities and shapes may be managed by differently shaped shaded, attenuated or otherwise enhanced conditions created by actuable, variable degree of actuation, and variable direction-of-light-affecting, regions of the windshield matrix. For instance, because reflective surface source objects 111 and 113 may reflect and produce light dimmer (less luminous) than the sun 105 at an observation point, shading regions creating shading condition 115 may be more strongly shaded than shading regions creating shading condition 117, allowing less light from that source to enter the eye of a user of the system, or other viewing destination. In addition, shading condition 117 may enhance the viewer's view of edges 111 and 113 by generating a high contrast superimposed (from the user's point of view) image, preferably, also on the matrix, which may be accomplished by retaining edge contrast and object definition and/or adding new viewing point destined light with a clearer, easier to view image, to better define a viewed object's (such as the truck's) edges and other attributes.

Figure 2:
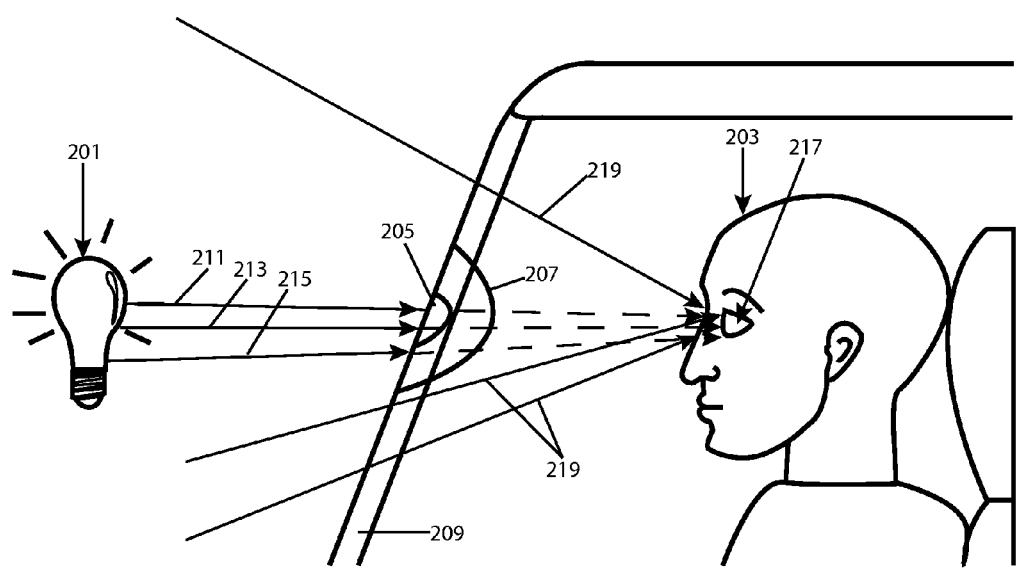
FIG. 2 depicts a side view of an operator seated in a motor vehicle, and observing an environment with the aid of hardware implementing aspects of the present invention.

FIG. 2 depicts a side view of an operator seated in a motor vehicle, and observing an environment with the aid of hardware implementing aspects of the present invention. A light-generating object 201 is within the user's observable environment, and is observed by the user 203. Dynamically-shaped and attributed shading, attenuating, augmenting or otherwise light-affecting conditions 205 and 207 condition, modify, shade, reduce, enrich or otherwise limit and/or augment light passing through semi-transparent, regionally actuable windshield/matrix 209, as variably set by the user and/or system. For example, light rays exceeding a threshold brightness (luminance) level per square area of the windshield through which the light passes, or that is projected to exceed a threshold level of brightness per unit of the user's field of vision, area of eye lens or retina, when passing through the windshield and to the user's eye or retina per area of eye or retina (an "observation point," 217), may be attenuated or shaded by an electrically, magnetically, or otherwise system-actuable or variable optic control in just those regions of the windshield through which such rays pass, and which optic control (such as actuable, directional shading within the regions) may selectively control, limit or augment light passing through at particular angles converging on a probable observation point, or group of actual or probable observation points. For example, exemplary rays 211, 213 and 215 depict some potential paths of light rays originating from the bright light-generating source 201, and passing through such shading or attenuating conditions/205 and 207. Rays 211 and 213 depict the path of light originating from an especially bright region of source 201, such as the center of a light bulb, which may be determined by the system by noting a differential in bright source regions (after randomly or otherwise assessing potential regional divisions) of the potential field of vision at the observation point impacted by source 201, and dividing source 201 into such different regions if the system determines the division and resulting conditions (with or without blending) to be efficient enough given an efficiency requirement that may be variably set by the user. Ray 215, by contrast, originates from a slightly less bright region (less candela per area, measured by rays cast from it, landing at the same observation point) of source 201. As rays 211 and 213 pass through the windshield, their origination from a source yielding a higher level of brightness per area at the eye, lens, retina or other observing point for the user (as is deduced by the system based on sensory information obtained by the system) leads to the creation of a specialized attenuating, shading or otherwise light altering or augmenting condition 205, which affects all or part of all rays originating from such a brighter region of source 201 and destined for an observation point, within a tolerance range for determining such an especially bright region, and with a margin for absorbing unpredicted rays, which margin may be variably set and may lead the movement of rays from such a bright region, based on perceived and predicted relative motion paths, or potential relative motion paths, of the source 201, the user 203, and/or the windshield 209, with respect to one another, in order to ensure a minimum probability of shading, attenuating or otherwise augmenting light rays projected to exceed a system threshold at the observation point. Light rays originating from a region of source 201 that is below a brightness threshold, but above another, lower brightness threshold exceeding average environmental or field of vision brightness per unit of field of vision or area of rays landing on an observation point, and which are projected also to intersect at the observation point 217, yield a second shading, attenuating or otherwise light-altering region 207, which may have less of a shading, attenuating or otherwise augmenting impact on such light rays passing through it. In this way, the source 201 may remain viewable in its entirety, rather than completely or partially blocked from viewing, in a graduated or gradated effect created by the multiple regions 205 and 207 (the former of which is generally greater in shading) blending together in a graduated manner. Light determined to be below the lower brightness (luminance) threshold, such as light passing along ray paths 219, may pass through the windshield unaffected by such specialized shading, attenuating or otherwise augmenting regions, but the overall matrix may be variably, optionally shaded to decrease overall environmental brightness (luminance) exceeding a tolerance level that may be set by the user and/or system.

Although regions 205 and 207 are shown to be distinct regions with hard boundaries, it is also possible for the system to create blending regions between multiple attenuation regions, or a single region and the background matrix transparency, to create a fade effect between them, or with levels or degrees of attenuation or shading matched to brightness levels of the rays passing through such that a more attenuated effect is achieved at the observation point for areas of greater brightness. A single region with changing shading, attenuation or other augmentation over its area, described by such a variable function, may also or alternatively, be implemented.

The system may assess observation point locations dynamically, by a sensor placed in front of, or nearby, in a related location (e.g., eyeglasses), and determine the angles of intersection at an observation point based on height, lateral position and distance of the observation point from both the windshield and the bright source, or both. But sensing the angles of light passing through, or projected to pass through, the windshield may also be used to create user-desired and/or system selected shading, attenuating or otherwise augmenting conditions/features, by determining that they will intersect at an observation point, the location of which may be variably set by the system or user, and may be determined by separate sensors or manual input (e.g., eye sensor, user adjustment of seat or manual adjustment of observation point location setting controls).

Figure 3:
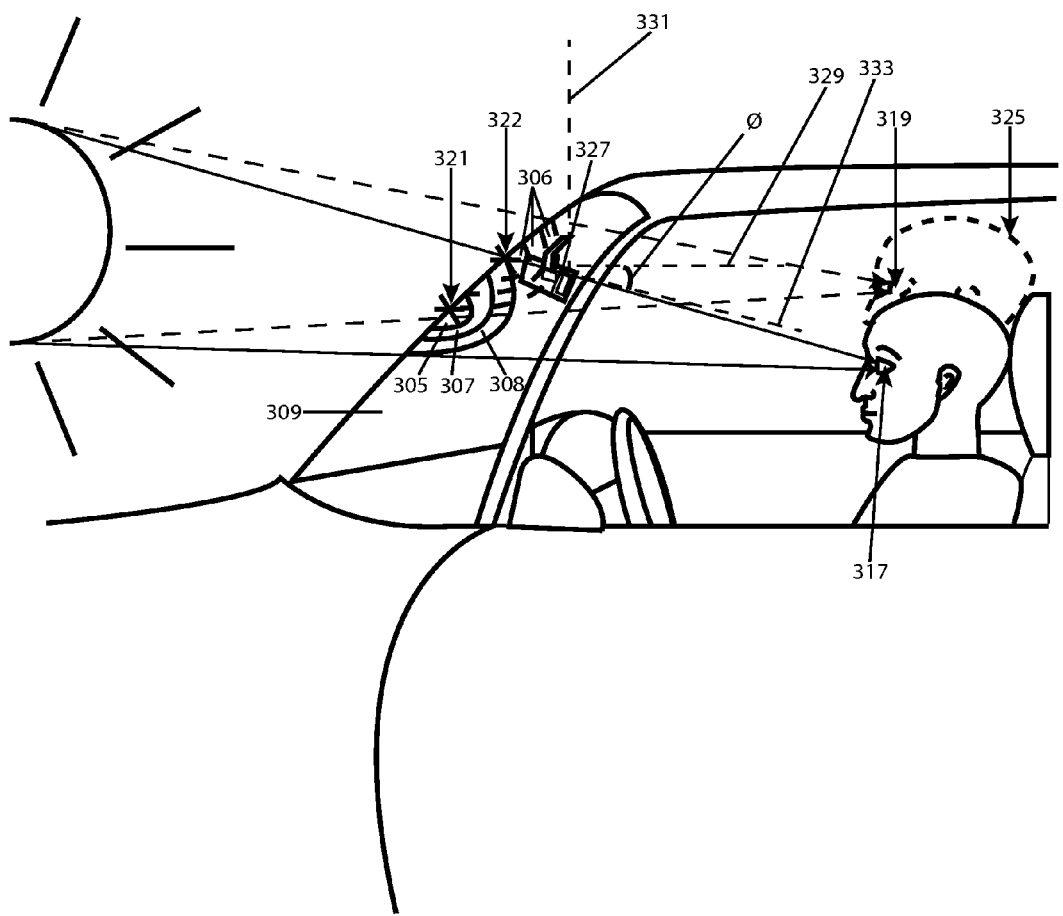
FIG. 3 depicts another side view of an operator seated in a motor vehicle, and observing an environment with the aid of hardware implementing additional aspects of the present invention.

FIG. 3 depicts another side view of an operator seated in a motor vehicle observing an environment with the aid of hardware implementing additional aspects of the present invention. With reference to this figure, aspects of the present invention addressing variable observation points, such as 317 and 319, can be better understood. Dynamically-shaped and attributed shading, attenuating, augmenting or otherwise light-affecting conditions 305, 307 and 308 again shade, attenuate, augment or otherwise affect light passing through a windshield variable light-attenuating matrix 309 according to projected threshold brightness (luminance) that would otherwise occur at an observation point 317. However, in this figure, the effect of the user raising his seat, being taller in a seated position or otherwise having a higher vantage point is shown by a secondary potential viewing position, outlined as position 325, and resulting secondary potential observation point 319. The system may automatically implement this shift in light augmenting matrix region locations and condition centers, shapes and boundaries based on the change in position of a reference point, or reference points, from which the user's observation point, or range of potential observation points, may be determined by sensors determining or indicating the instantaneous location of them (e.g., glasses with location sensors, or eye location detecting sensors or scanners). However, in a preferred embodiment, such sensors are not required because the user may indicate such changes by indicating eye-location through the gesture of adjusting common vehicle controls, such as rear-view mirrors, which also depend on eye level. Calibrating input devices, such as dial 327, may allow the user to adjust the center of light augmenting conditions and regions of the matrix implementing them in multiple directions on the matrix, independently of such a mirror adjustment, while nonetheless pinning further adjustments to mirror movement. In this way, if the user changes position to secondary observation position 325, and adjusts his or her rear view mirrors to a more acute vertical angle with the ceiling, angle ø shown (between line 329, which is parallel to ceiling, and line 333, along the top of the mirror (or perpendicular to the mirror face to the observation point), an automatic adjustment of resulting conditions and the regions of the shading matrix implementing them to positions 306 can be made. Factors such as distance from the rear view mirror may further affect the accuracy of average assumed adjustments assumed by the system to be appropriate, requiring calibrating adjustments, as with multiple axis dial controls such as 327, which may adjust condition width and amounts of regional shading, as well as shading location. Another control for calibration may further adjust the size, shading effects and shading darkness of the regions 306, to suit the user's needs and preferences.

The system may implement, set and adjust multiple shading regions for multiple observation points, and, preferably, may affect only observation point directed light rays. Through substantial directional light filtering, these multiple shading regions may be surgically applied, preventing or reducing the shading, attenuating or otherwise augmenting conditions and their implementing regions of the matrix affecting one observation point from being perceptible to or otherwise substantially affecting the field of vision of another observation point.

Figure 4:
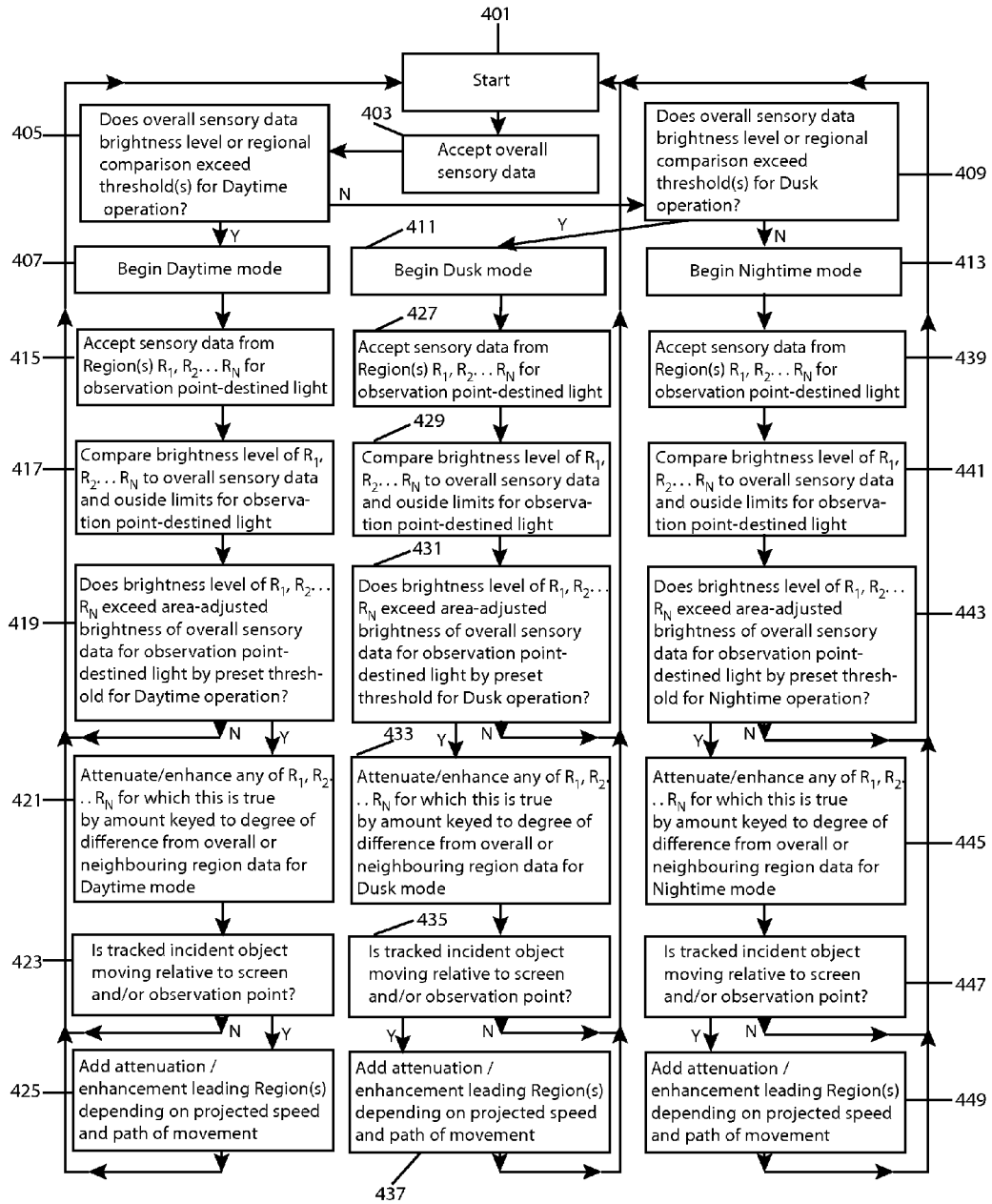
FIG. 4 is a process flow diagram for an exemplary method 400 of implementing certain light-conditioning, -enhancing, -augmenting or otherwise -affecting aspects of the present invention.

FIG. 4 is a process flow diagram for exemplary steps 400 that may be taken by a system, such as a hardware and software system, implementing certain light conditioning, enhancing, shading, limiting, augmenting or otherwise affecting aspects of the present invention. In step 401, the process begins and proceeds to step 403, in which the system accepts data input from sensors communicating overall light conditions surrounding the user environment (e.g., outside a vehicle and inside the vehicle where the user is seated, or simply surrounding a user and/or light augmenting or affecting matrix). If data is gathered from sensors in different environmental regions, such as a region outside of a vehicle and a region inside that vehicle, overall data (such as an average brightness level) from each region may be considered and/or compared to one another to determine different modes of operation for the system. For example, in step 405, if the ratio of average light density (brightness/luminance) from outside sensors to average light density from inside sensors is greater than a variably set or predetermined threshold below which a dusk mode or nighttime mode should be entered, the system may determine that it should enter a "daytime mode," beginning in step 407. Alternatively, a simple overall brightness level from overall environmental brightness sensor(s), rather than regional comparisons, may be taken and compared to a threshold in step 405, and, if the threshold is exceeded, the system may enter daytime operation mode in step 407. If regional comparisons are used, however, in step 405, the amount of difference between the regional measures may be used, as well as simple threshold ratio amounts, to determine a proper mode of operation. For example, if a more slight scalar difference between out-of-vehicle and inside-vehicle readings is noted, a dusk or nighttime mode or other mode for preserving light transmission and moderating attenuation (with a lower amount or area of shading, for instance, or with a later brightness level onset of shading light destined for an observation point) to retain more feature definition and contrast, under those conditions, may be used. In any event, if the system determines that overall sensory data, with or without regional comparisons, will cause the entry of a daytime mode, it initiates a daytime mode process, at step 407. If, by contrast, levels of brightness or regional comparative brightness differences are inadequate to enter daytime mode because, for example, they do not exceed the set thresholds for entering daytime mode, the system proceeds to step 409, in which overall sensory data is compared against other threshold(s) for entering an intermediate mode, such as a "dusk mode." Once again, regional brightness differences may be compared, or overall brightness data may be taken and measured against such thresholds. If such thresholds for entering a dusk mode are exceeded, the system may proceed to dusk mode operation, at step 411. If, however, such thresholds are not exceeded, the system may default to proceed to nighttime mode operation, at step 413.

Beginning with the first step in daytime mode operation, if entered, the system proceeds to step 415 after entering daytime mode. Sensors dedicated to a plurality of variable regions of a semi-transparent viewing matrix, such as an augmented glass windshield of a motor vehicle with actuably, directionally shadable regions, relay sensory data for fixed time periods or points in time to the system. Preferably, each region is equipped with at least one sensor and has the capability of individually sensing and shading or otherwise altering aspects within its volume selectively and affecting light of a selected angle of transmission and destination, to shade or augment light passing through the matrix according to whether it will intersect with a point of observation, which may be variably set by the user and/or system. Even more preferably, each region is small enough and of a substantially tessellated shape to allow total coverage of the entire matrix, and a variety of different shapes (and margins surrounding such shapes) covering any substantially observable section of the matrix. At step 415, sensory data corresponding to each region, such as those that may be labeled in a sequence of any necessary number of regions to cover the matrix (as may be expressed: $R_1$, $R_2$ through $R_N$), are passed from the sensors to the system. Preferably, these data are brightness/luminance levels per region or span of the user's field of vision for light passing through each region that will intersect with a point of observation, and adjusted and assessed based on luminance per/area at the observation point. Also preferably, these data are passed from the sensors for a given period of time, which is preferably small enough to avoid a flickering effect or other detection by a user under all usually encountered light conditions, given the human or other user/observer's persistence of vision or other viewing tolerance. In step 417, the system preferably proceeds by comparing the brightness/luminance levels of each region to overall average brightness levels from all sensors (i.e., to area-adjusted overall brightness). Next, in step 419, the system determines, for each region, whether observation point-destined light rays passing through the region have a total brightness/luminance that exceeds, by an amount exceeding a set threshold, the average area-adjusted overall brightness for the entire matrix. Alternatively, or in addition, a hard cut-off brightness level may also be included as an additional comparison threshold level. If the brightness level for a region is above such a threshold, the system then proceeds, in step 421, to shade, attenuate or enhance the observation point-destined light passing through the region, making it easier, less potentially damaging and/or painful to observe light passing through that region and through to the observation point. Preferably, the amount of shading, attenuation or other enhancement is keyed by the system according to preset appropriate levels for daytime mode, and/or (by a function describing weighting for each, in the instance of both) is keyed to brightness level of the rays attenuated/enhanced. If thresholds were not exceeded in step 419 for any region, the system may return to the starting position 401. If thresholds were exceeded in step 419, however, and if the system proceeded to shade, attenuate, or otherwise attenuate regions of the matrix, the system next proceeds to step 423 after such shading, or other attenuation or enhancement for each region for the system's cycle time interval has take place. In step 423, the system next determines if an object creating shading, attenuation or other enhancement of regions or a group of regions is moving relative to the user and/or the matrix, and tracks that movement. If so, the system proceeds, in step 425 to add additional "leading margin" shading, attenuation or other enhancement at the margins of the outer edge of such regions corresponding with the direction of movement of the object, at distances projected to block future light from the object from reaching the observation point(s) (which may be a range of possible observation points). For example, if an incident object that casts observation point-destined light rays of an intensity beyond a threshold "keyed" difference from overall brightness data for shading is determined or modeled by the system to be moving or accelerating toward the right-hand side of the vehicle, in front of the windshield, and also to the user's right-hand side, at 1 meter per second squared, a leading margin of shading may be added to intercept future light rays substantially instantaneously in the region of the windshield/matrix that will receive that future light, and in an amount of shading that may either match the remainder of the shaded region, or that may be graduated (thinning toward the edge of the direction of movement) and provide some shading to a wider area of probable intersection, based on an analysis of the probability of object movement and intersecting incident light rays, or, also optionally, based on vehicle movement command data, such as the user steering the car to the left, which would also cause the incident object to move toward the right of the vehicle. In addition, or alternatively, the shaded regions corresponding with the moving object or light source may themselves be shifted in the direction of movement at a rate determined to correspond with the likely future propagation of observation point destined light rays from the object. After creating the appropriate movement-based attenuation, shading or other enhancement for the interval handled in the operation cycle, the system returns to the starting position, 401, and again proceeds to step 403.

Optionally, and which may be preferred to save manufacturing costs, sensors may be less than one per-region, with the system creating a model of light intersecting each region, based on light density and angles emanating from the surrounding environment at the more limited locations of the sensors and based on known angle and location differences of each region from the point of the sensor and from light source objects. In fact, a single sensor may be used, but, preferably, more than one sensor is used in order to generate 3-dimensional/model information about objects in the surrounding environment. Also preferably, sensors are embedded in a structural element nearby the matrix without physically blocking the user's view through the matrix.

Turning to the dusk and nighttime modes of operation, as discussed above, if at step 405 the system determines that average overall brightness levels, or differences based on regional comparisons, do not exceed a threshold amount for entering the daytime mode, the system instead may enter a dusk mode or nighttime mode, depending on further comparisons of sensory data to predetermined action-triggering levels sensed (thresholds) determining whether to enter each of those modes, at step 409. If the threshold(s) for entering dusk mode are exceeded, the system proceeds at that point to steps 411 and then 427, or, if those thresholds are not exceeded, the system may proceed to steps 413 and 439. In either event, the system enters a series of steps similar to those discussed with respect to daytime mode, except that levels and/or rations of brightness/luminance detection thresholds for creating shading, attenuation and other dynamic enhancement features (and the amount, degree or type of shading, attenuation or other enhancement themselves) may differ significantly from those implemented in daytime mode. For example, in nighttime mode, at step 443, the system may tolerate greater differences in regional light readings, and in comparison to overall brightness levels, before creating shading, attenuation or other enhancement in regions with brighter-than-tolerated incident light destined for an observation point. Similarly, the amount or degree of shading, attenuation or other enhancement implemented may be less or change the character of the apparent object to user to make it less bothersome, yet easy to see. For example, the brightness (luminance) of the object may be shaded by less lumens or candela per area or less of a fraction of overall field of vision brightness/luminance at the observation point than with shading in daytime mode for the same brightness or relative brightness level object, or the definition of the apparent object may be enhanced, and may be shifted in spectrum to be easier to view in dark, nighttime conditions. In addition, leading margins may be eliminated or decreased in size or amount, or taper off more quickly if graduated, or otherwise may be altered to avoid blocking dim neighboring objects which would otherwise be more difficult to see at night. To a lesser degree, dusk mode thresholds and shading, attenuation or other enhancement may differ from daytime mode operation in the same way, making it an "intermediate mode." Of course, a three-mode system, such as that shown in FIG. 4, is not exhaustive of the approaches within the scope of the invention, and is purely illustrative. A much greater number, or infinite gradations, of different modes, or a 1- or 2-mode system, may also be used, and may address an infinite number of lighting, object, object movement and contrast or event conditions that the system or user seeks to specifically address by matrix regional conditions and light alteration or enhancement.

In one aspect of the present invention, light is added or replaced and may be generated from other forms of energy by the system, to propagate in the same or related directions when compared to rays of light destined for an observation point. This addition can be made selectively to observation point destined light rays emanating from identified objects (e.g., other vehicles) to brighten, label or boost contrast and of visibility of the object to a user of the system. In this way, the visible scene, and important aspects thereof, for the user may be made easier to rapidly acquire visually and mentally.

Figure 5:
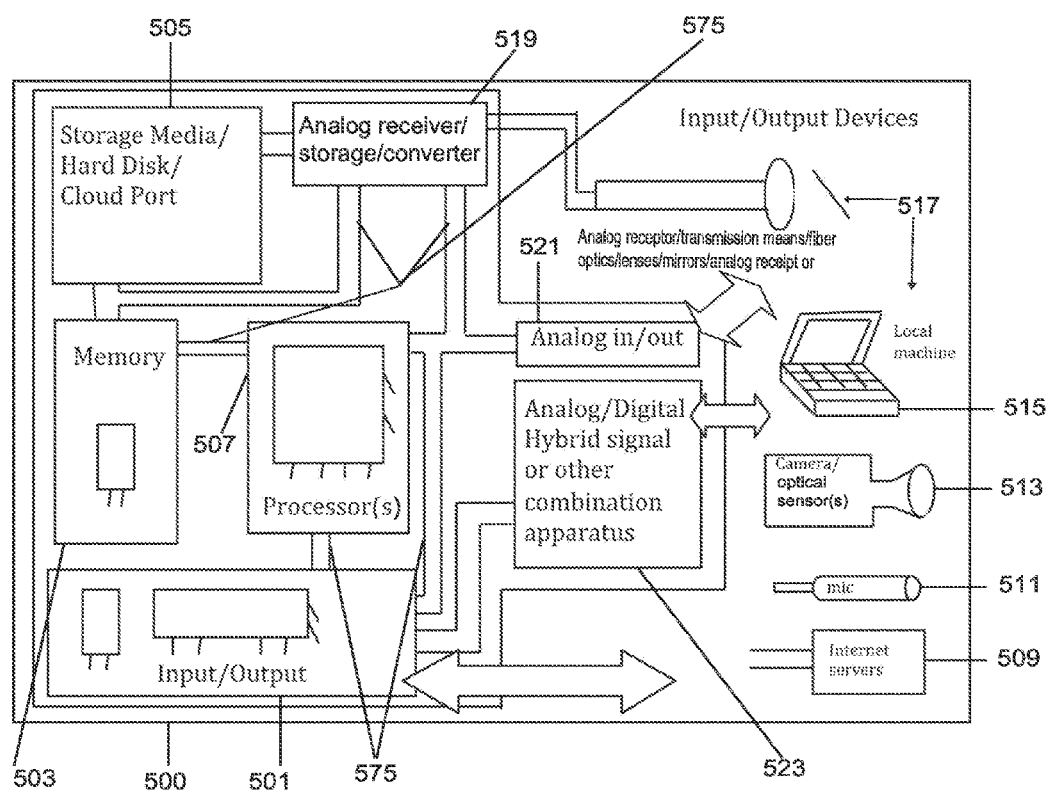
FIG. 5 is a block diagram of some elements of a system that may be used in carrying out aspects of the present invention.

FIG. 5 is a schematic block diagram of some elements of an exemplary system 500 that may be used in accordance with aspects of the present invention, such as sensing light via regional sensors, creating shading, attenuating or other enhancing conditions in a semi-transparent matrix, running a touch-actuable matrix and multiple directable light sources, and managing camera shake and other undesired optic movements. The generic and other components and aspects described are not exhaustive of the many different systems and variations, including a number of possible hardware aspects and machine-readable media that might be used, in accordance with the present invention. Rather, the system 500 is described here to make clear how aspects may be implemented. Among other components, the system 500 includes an input/output device 501, a memory device 503, storage media and/or hard disk recorder and/or cloud storage port or connection device 505, and a processor or processors 507. The processor(s) 507 is (are) capable of receiving, interpreting, processing and manipulating signals and executing instructions for further processing and for output, pre-output or storage in and outside of the system. The processor(s) 507 may be general or multipurpose, single- or multi-threaded, and may have a single core or several processor cores, including microprocessors. Among other things, the processor(s) 507 is/are capable of processing signals and instructions for the input/output device 501, analog receiver/storage/converter device 519, and/or analog in/out device 521, to cause a display, light-affecting apparatus and/or other user interface with active physical controls to be provided for use by a user on hardware, such as a personal computer monitor (including, but not limited to, digital camera monitors or touch-actuable displays) or terminal monitor with a mouse and keyboard and presentation and input software (as in a GUI), and/or other physical controls. For example, and with particular reference to the aspects discussed in connection with FIG. 9 et seq., the system may carry out any aspects of the present invention as necessary with associated hardware and using specialized software, including, but not limited to, window presentation user interface aspects that may present a user with the option to hold or accelerate a magnetically-actuated floating lens assembly, or to turn on or bias the system toward image stabilization, which would permit the lens assembly to more freely float in space or remain aimed at an observation point, for example, with drop-down menus, selection and movement control commands (e.g., mouse with cursor or keyboard arrows or variable degree trigger switch) with different settings for each such command. As another example, with reference to FIGS. 1-8, such software may, with or without presentation of options to a user for selection on a conventional computer monitor, carry out any aspect of the invention as necessary, such as, but not limited to, identifying a reference point for an observation point, determining a range of possible or likely observation points, and implementing other user interface and processing aspects that may be used in the art, such as physics engines, physical modeling, detection, image-creation and remote control (and related software). The processor 507 is capable of processing instructions stored in memory devices 505 and/or 503 (or ROM or RAM), and may communicate via system buses 575. Input/output device 501 is capable of input/output operations for the system, and may include any number of input and/or output hardware, such as a computer mouse, keyboard, networked or connected second computer, camera(s) or scanner(s), sensor (s), sensor/motor(s), electromagnetic actuator(s), mixing board, reel-to-reel tape recorder, external hard disk recorder, additional hardware controls and actuators, directional shading matrices, directionally actuable light sources with variable collimation and shiftable bases, additional movie and/or sound editing system or gear, speakers, external filter, amp, preamp, equalizer, computer display screen or touch screen. It is to be understood that the input and output of the system may be in any useable form, including, but not limited to, signals, data, and commands/instructions. Such a display device or unit and other input/output devices could implement a user interface created by machine-readable means, such as software, permitting the user to carry out the user settings, commands and input discussed in this application. 501, 503, 505, 507, 519, 521 and 523 are connected and able to communicate communications, transmissions and instructions via system busses 575. Storage media and/or hard disk recorder and/or cloud storage port or connection device 505 is capable of providing mass storage for the system, and may be a computer-readable medium, may be a connected mass storage device (e.g., flash drive or other drive connected to a U.S.B. port or Wi-Fi) may use back-end (with or without middle-ware) or cloud storage over a network (e.g., the internet) as either a memory backup for an internal mass storage device or as a primary memory storage means, or may simply be an internal mass storage device, such as a computer hard drive or optical drive. Generally speaking, the system may be implemented as a client/server arrangement, where features of the invention are performed on a remote server, networked to the client and made a client and server by software on both the client computer and server computer.

Input and output devices may deliver their input and receive output by any known means of communicating and/or transmitting communications, signals, commands and/or data input/output, including, but not limited to, the examples shown as 517. Any phenomenon that may be sensed may be managed, manipulated and distributed may be taken or converted as input or output through any sensor or carrier known in the art. In addition, directly carried elements (for example a light stream taken by fiber optics from a view of a scene) may be directly managed, manipulated and distributed in whole or in part to enhance output, and whole ambient light information for an environmental region may be taken by a series of sensors dedicated to angles of detection, or an omnidirectional sensor or series of sensors which record direction as well as the presence of photons recorded, and may exclude the need for lenses or point sensors (or ignore or re-purpose sensors "out of focal plane" for detecting bokeh information or enhancing resolution as focal lengths and apertures are selected), only later to be analyzed and rendered into focal planes or fields of a user's choice through the system. For example, a series of metallic sensor plates that resonate with photons propagating in particular directions would also be capable of being recorded with directional information, in addition to other, more ordinary light data recorded by sensors. While this example is illustrative, it is understood that any form of electromagnetism, compression wave or other sensory phenomenon may include such sensory directional and 3D locational information, which may also be made possible by multiple locations of sensing, preferably, in a similar, if not identical, time frame. The system may condition, select all or part of, alter and/or generate composites from all or part of such direct or analog image transmissions, and may combine them with other forms of image data, such as digital image files, if such direct or data encoded sources are used. Specialized sensors for regions of a pass-through matrix, such as a regionally-shadable windshield, sensors detecting the location of objects to be focused on or yielding observation point destined light, and sensors selecting points of reference to be tracked in a sensed and/or photographed scene and sensors capturing the forces applied to sensor/motors may also be included for input/output devices, among many other examples required according to other sections of this specification.

While the illustrated system example 500 may be helpful to understand the implementation of aspects of the invention, it is understood that any form of computer system may be used to implement many aspects of the invention—for example, a simpler computer system containing just a processor (datapath and control) for executing instructions from a memory or transmission source. The aspects or features set forth may be implemented with, and in any combination of, digital electronic circuitry, hardware, software, firmware, or in analog or direct (such as light-based or analog electronic or magnetic or direct transmission, without translation and the attendant degradation, of the image medium) circuitry or associational storage and transmission, any of which may be aided with external detail or aspect enhancing media from external hardware and software, optionally, by networked connection, such as by LAN, WAN or the many connections forming the internet. The system can be embodied in a tangibly-stored computer program, as by a machine-readable medium and propagated signal, for execution by a programmable processor. The method steps of the embodiments of the present invention may be performed by such a programmable processor, executing a program of instructions, operating on input and output, and generating output. A computer program includes instructions for a computer to carry out a particular activity to bring about a particular result, and may be written in any programming language, including compiled and uncompiled, interpreted languages, assembly languages and machine language, and can be deployed in any form, including a complete program, module, component, subroutine, or other suitable routine for a computer program.

Figure 6:
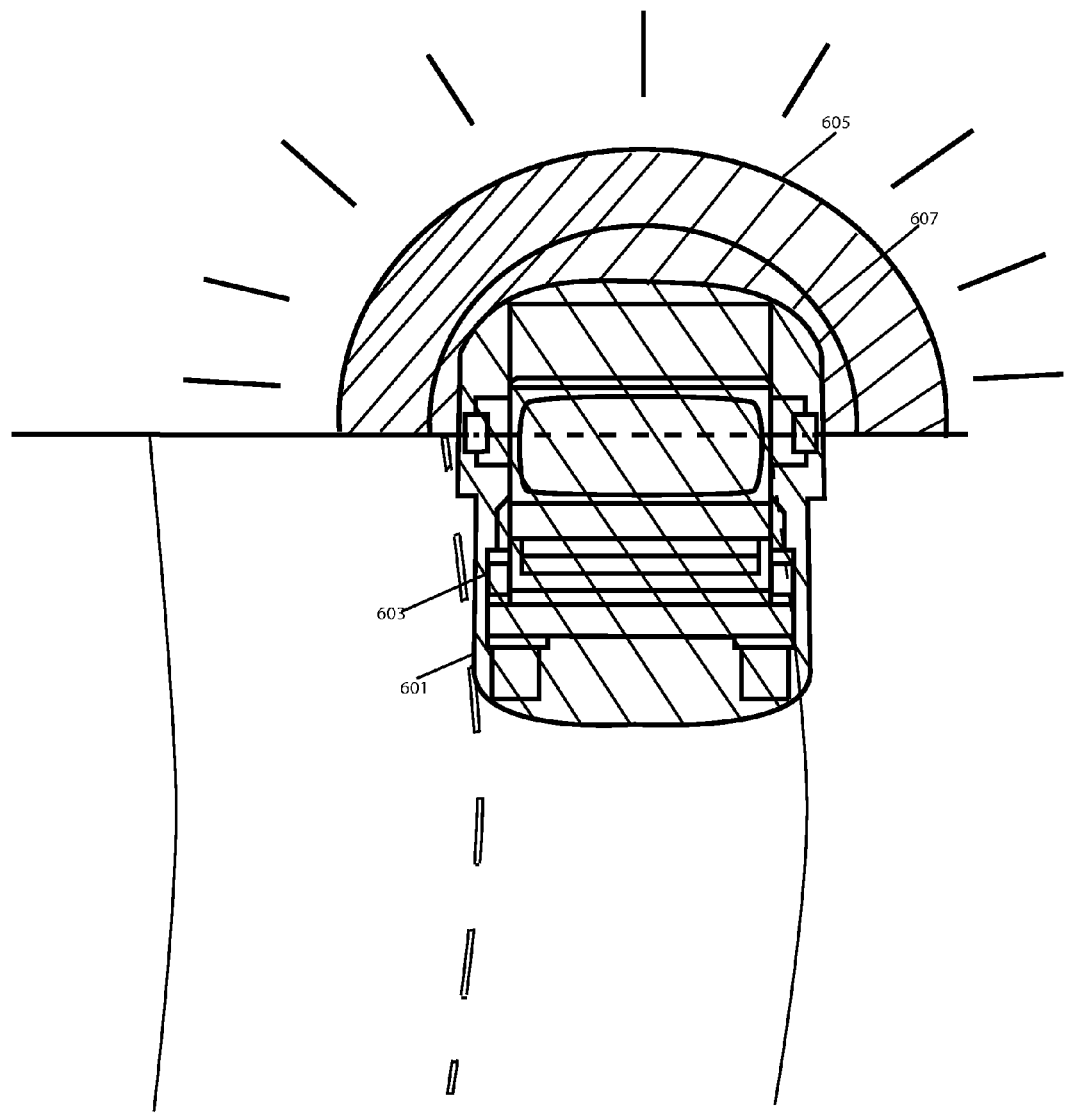
FIG. 6 depicts an environmental perspective view that a user of a system carrying out aspects of the present invention may encounter, with specialized shading and/or enhancement features designed to define and control environmental conditions.

FIG. 6 depicts an environmental perspective view that a user of a system in accordance with aspects of the present invention may encounter, with specialized shading and/or enhancement features designed to define and control environmental conditions. In this illustration, enhancement condition 601 is overlaid onto an oncoming vehicle 603 facing the viewer and the viewer's vehicle head-on, from the wrong (driver's of vehicle's left-hand) side of the road for traffic in most United States two-lane, two-directional vehicle roads. A shading or attenuation condition 605 also appears over a light source object (in this instance, the sun 607) of sufficiently great and/or differential brightness from other ambient light that would otherwise reach the observation point(s) to trigger the system to create a shading or attenuation condition/element over it, reducing glare and brightness for observation point-destined light rays passing through the matrix/medium of the associated windshield/matrix shadable or otherwise directionally light attenuable or enhanceable region(s), as, for example, may be accomplished by the methods discussed with reference to FIG. 4. Using system aspects as discussed with reference to FIG. 5, and elsewhere in this application, the system may identify the oncoming vehicle 603 as a collision hazard, for example, by headlight detection and other vehicle orientation detection methods, leading to the creation of condition 601 to alert the user. In this scenario, the system places a priority on the enhancement condition/element 601, making it visible above, and without alteration by, shading condition/element 603, for example, due to a priority order implemented by the system based on condition importance and prominence for display of classes of light enhancement or attenuation conditions using the actuable matrix. The enhancement condition 601 may have additional visibility-enhancing and alert characteristics (such as a flashing red hue or warning message, which may be accompanied by text or sound alerts) to further call out the underlying oncoming vehicle image and the potential danger the object may pose to the user. Meanwhile, the system still reduces glare and viewing damage from the bright object 607 behind the vehicle, but only in the region not subtracted due to the superseding element 601. The system may determine that the oncoming vehicle poses a collision hazard for the user by any number of collision detection subsystems and physical models, in addition to assessing its presence and facing direction from an improper, oncoming lane. For example, the system may also assess the speed and projected collision time to assess adequate safety, with consideration of the user's vehicle's speed and direction.

Figure 7:
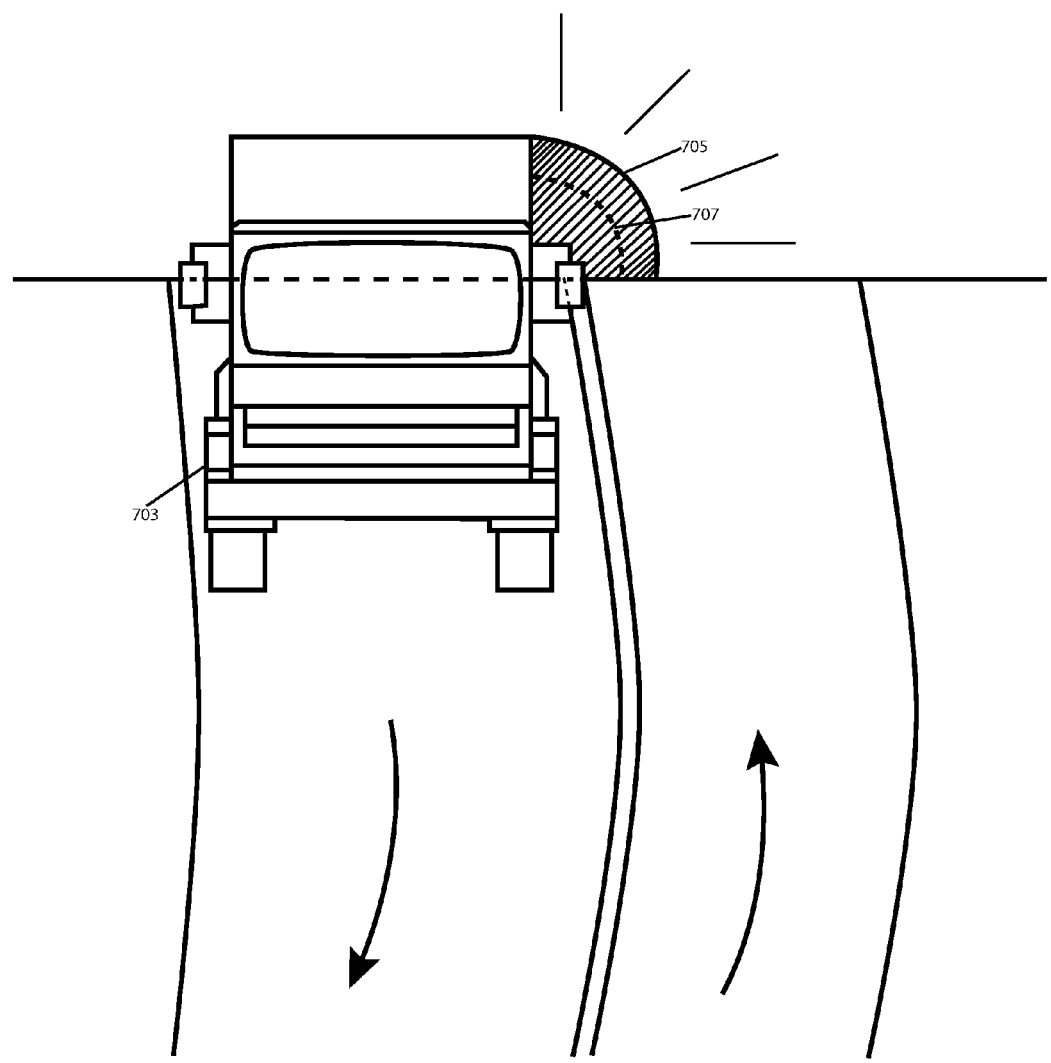
FIG. 7 depicts another environmental perspective view that a user of the system may encounter, with differences in specialized shading and/or enhancement features from features depicted in FIG. 6, to demonstrate additional aspects of the present invention.

FIG. 7 depicts another environmental perspective view that a user of a system in accordance with aspects of the present invention may encounter, with differences in specialized shading and/or enhancement conditions/features from those depicted in FIG. 6, to demonstrate additional aspects of the present invention. In this instance, an oncoming motor vehicle 703 does not cause the system to overlay an enhancement or alert feature over the motor vehicle, unlike the environmental view scenario discussed with respect to FIG. 6. Although the system may still determine that the vehicle is oncoming, as a general matter, it may employ a physical model and rule system that determines that a collision between the motor vehicle and the user's motor vehicle is too unlikely to trigger an alert, given the nuisance that frequent false alerts would pose. Alternatively, a more subdued, smaller, or less intense warning overlay region may be, but need not be, employed to call out the presence of the oncoming vehicle, which, as with each subfeature of the invention, may be system- or user-adjustable or system- or user-determined. More specifically with respect to the physical model and system determination that too low a threat exists to create an alert of the nature discussed in FIG. 6: the system may through vehicle traffic lane detection and vehicle location detection determine that the oncoming vehicle is in the correct lane which, if continued to be followed, will not result in a collision—even if the turn in the road might yield simpler physical models to incorrectly project a potential collision based on instantaneous velocities. The system may also withhold warnings based on such collision/intercept velocities if the vehicle accelerations indicate correction that will not yield a collision, even if the oncoming vehicle is initially momentarily in the wrong lane, for example, at too great a distance away to create an alert. A shading or attenuation condition 705 covers just the visible parts of the bright object 707. An additional enhancement region (not pictured) may reduce or replace a halo effect from the bordering region of the bright source 707.

While systems with computational aspects actuating a variable matrix are preferred for reducing brighter sources or regions from a user's field of vision, an automatic physical filter with directional limits may also be used, for example, embedded in a semi-transparent matrix. In these aspects, directional light filtering may be applied in general directions approximating the direction away from the matrix of user(s)' possible observation points. In this way, when light is passing through the matrix at too great a luminance (per square area of the matrix through which it passes) beyond the directional limit of the matrix and filtering material, or with concentrations of directional filtering material to render a limit at the observation point, no further light may pass through the material in that direction, but may in other directions, within a certain angle tolerance to protect varying observation points. This directional limit filtering may be accomplished by substantially flat (flatness varying based on the degree of angle tolerance sought, discussed immediately above) light-absorbing particles that orient themselves in a direction opposing light ray flow direction, and with greater alignment effect as greater luminance occurs, for example, with the use of light-chargeable matrix region omni-angled wall sections that charge parts of the walls that so align the charged, shading particles. This may be accomplished by perpendicular absorptive lenses and/or wall sections, such that charges at 90 degrees from the light path result at those wall sections corresponding with that angle, and the shading particles, with opposing charges at their edges, align themselves against the direction of the light.

Figure 8:
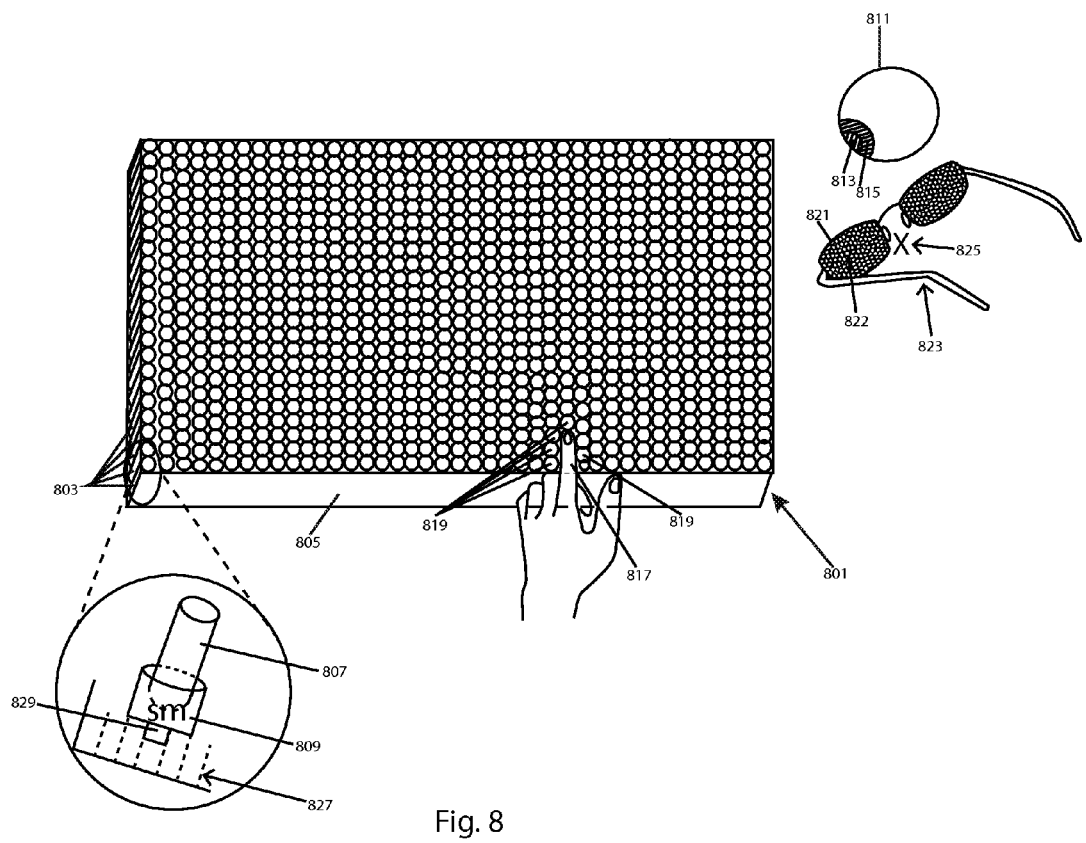
FIG. 8 depicts an interactive touch-actuable optical matrix and optional additional viewing apparatus, as may be used in accordance with aspects of the present invention.

FIG. 8 depicts a perspective view of an interactive touch-actuable viewing matrix 801 comprising light sources and an optional auxiliary viewing apparatus (specialized glasses 823), as may be used in accordance with aspects of the present invention. The viewing matrix 801 comprises a plurality of angle-directable and base location-shiftable, variably-collimated light source units, such as those shown as 803. While a containing mounting 805 may house and provide support and a structure for movement (using, for example, actuators) for the bottom and lateral sides of directable light source units such as 803, part of the left-hand side of that mounting 805 is not included in the figure, in order to aid in visualizing the 3-dimensional composition of those light source units 803. Each light source unit 803 comprises a directable light-producing/lensing unit 807, embedded in a pivoting sensor/motor actuator 809, allowing the system to produce and direct light rays of varying collimation, emanating generally or specifically (depending on the selected, system or user-variable degree of light collimation) in the direction of the length of the cylindrical light-producing/lensing unit 807 body. As explained in greater detail below, by changing the angles and collimation of each unit 807 to deliver pulses of sufficient duration at necessary angles to create a varying perspective impression with eye movement, for example, using the sensor/motors 809, in pulse duration and spacing that exploits the human persistence of vision, the system may both create three-dimensional images of virtual objects of varying depths in a user's potential field of vision and reduce or even substantially hide the presence of objects between the matrix and the observation point (typically, a human eye) 811, at the pupil 813 (shown within an iris 815) with a final destination of a retina (not pictured). Preferably, light ray angles to place image-generating light at all possible rotational positions and positional shifts of an eye or retina as the observation point are produced by the matrix 801, and the system produces different images corresponding with different perspectives that would result from such possible eye rotation and shift matched by an opposing unit 807 position, corresponding with those additional angles and positions to create the appearance of the common virtual object regardless of eye position and orientation. Using this technology, 3-D perception is greatly aided over what is ordinarily possible with separate image information for each eye only, as is done in 3-D photography and viewing techniques. To further explicate: First, the distance of a virtual object projected by the matrix may be varied almost infinitely by adjusting the angle and degree of collimation of efferent light from each light source to produce the image of a viewable object, including light sources 803. By reducing collimation to scatter light at a variety of angles and by simultaneously directing each lensing unit 807 perpendicularly from the length and width of the back of the mounting, a simple two-dimensional picture may be created. However, some units may instead be used to create a virtual 3-D object image for a viewing point, such as 813, which object may have a nearly infinite variety of apparent distances from the user, at the election of the system, for example, according to the requirements of played media recorded from camera sensors recording (or recording systems extrapolating) light angle and source position virtual object information for a variety of corresponding viewing angles and position shifts from a recording format including those parameters. This may be accomplished by several of the units such as 807 directing more collimated, or narrower divergently (or convergently in front of the observation point from reversed sides, to create the appearance of an object in front of the matrix) angled light corresponding with the object's efferent light profile for the viewing point, from angles more acute than perpendicular (which angles depend on the distance and size of the object sought to be simulated) and toward all possible or likely shifted and rotated positions for an eye and retina, with virtual object information corresponding with those angles and positional shifts. The closer to perpendicular from the length and width of the mounting bracket, the further away an object will appear, until infinity, caused by substantially parallel emanating light rays. To simulate an adequate 3-dimensional virtual object for multiple viewers and/or multiple eyes of one viewer (simultaneously reinforcing the 3-D effect more strongly, due to two eyes with varying angles greatly increasing depth perception) some units may target one eye or viewer with more collimated light, preventing interference with the other eye or viewer, while other units target the other eye or viewer, with virtual object light angles and source positions corrected in perspective for each eye's position. Alternatively, or in conjunction, units may pulse light rays targeting one eye or viewer and then shift to pulse light rays targeting the other eye or viewer, in sufficient frequency and duration to avoid perception by the viewer, due to the persistence of vision effect (exploited in multiple frame cinema). Objects even closer to the viewer than the matrix may be simulated by more acute light ray angles (which, as noted above, may result from reversed-sided light-carried information relative to light-carried information from units corresponding with images further away, beyond the matrix from the viewer) and, if enough light is used, virtual objects of any distance, and particularly, closer distances, may be used to overwhelm the appearance of other objects in between the matrix and the viewer, causing them to be effectively hidden and appear to disappear. For example, in the context of a matrix in accordance with the present invention that is also a touch screen, a user may use his or her finger 817 to touch-actuate the screen. However, the user's finger 817 need not block the user's view of the screen (as it does in conventional touch screens) if surrounding units, such as units 819, adjust their collimation and shift their angles and positions to pulse light of sufficient duration to substantially replace light from the units otherwise hidden beneath the user's finger 819. This is especially effective in instances where objects of a substantially different apparent distance than the user's finger are used, because the user's eye and/or eyeglass lens will naturally blur and scatter competing light from the user's finger or stylus. However, specialized lenses, such as those depicted as 821, with sub-component lenses 822 of varying focal lengths can be used to exaggerate that difference, and more effectively replace image data from behind a hiding object, such as a user's finger. Certain of the subcomponent lenses 822 may be oriented and have the proper focus to create the impression of virtual objects from source units 803 that are not, in fact, sending light from those angles but, due to the refraction of those sub-component lenses, appear to be. Meanwhile, other subcomponent lenses 822 may have a focal length that exaggerates the apparent difference in distance from an intervening object and the location of the virtual objects generated by the matrix, even in the event that a flat screen effect is being created by the matrix. Together, these aspects further scatter competing light from interfering objects and fully replace light of the correct angle and apparent source for light blocked by interfering objects. Light source units 803 must have dynamic, highly accurate targeting abilities, and the system must track the orientation and location of the auxiliary viewing apparatus 823, and be further programmed with locational information for each type of lens subcomponent 822, to carry out these aspects of the invention. It is preferred that each of the lenses of the auxiliary apparatus absorb or scatter light from the angle of departure from the location of interfering objects (e.g., up to 0.5 inches in front of the matrix) and/or reflect or block it out of view of the viewer's eye. Compound lens subcomponents 822 that adjust focal lengths according to orientation of each lens sub-component may be necessary to carry out these aspects. Positional shifts of light source units 803 may be managed by structural actuable tracking components 827, which the base of units 803 may move along in any direction along the mounting 805 floor and/or walls, with the aid of a fitting member 829 on each unit 803.

Figure 9:
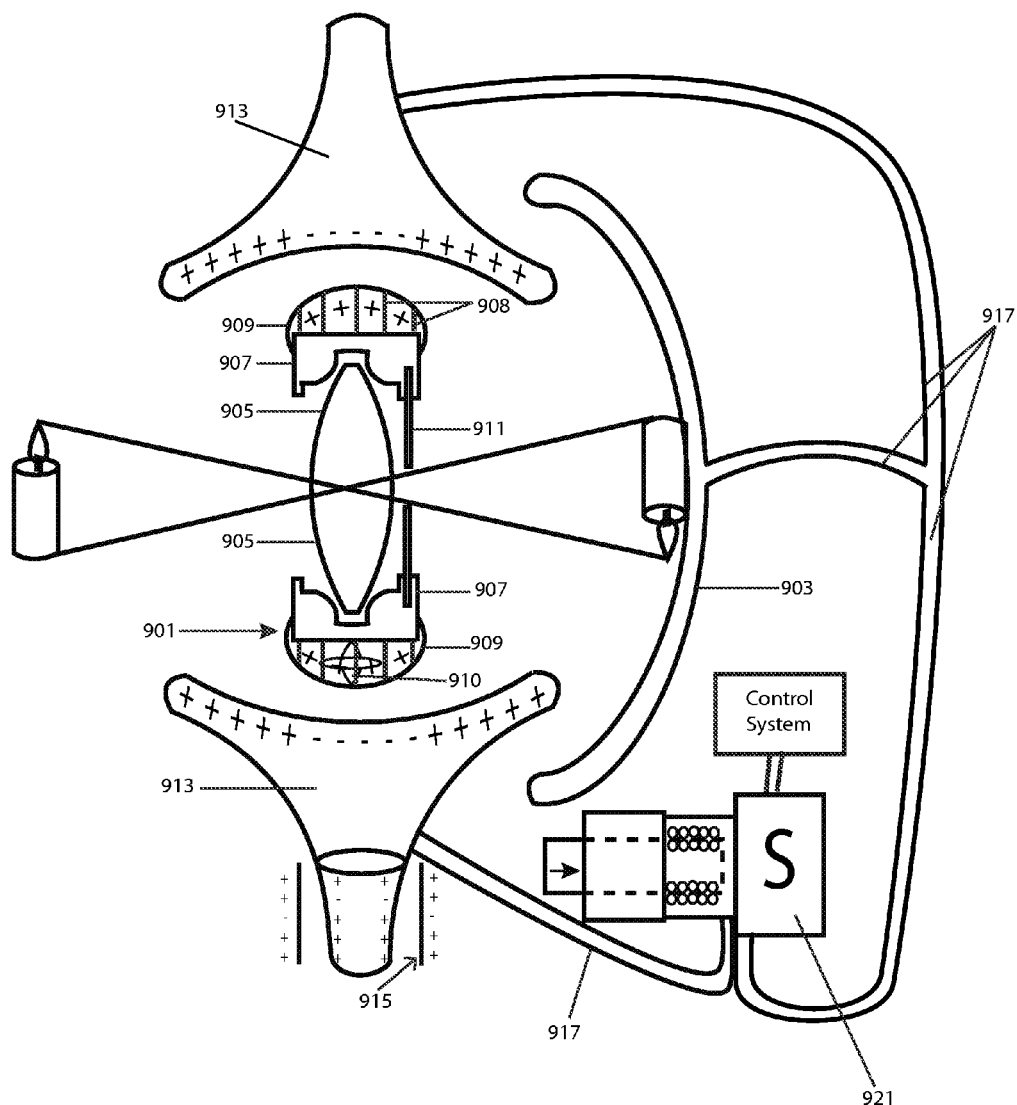
FIG. 9 depicts sensor and camera motion management hardware of a system implementing aspects of the present invention, including a variably-actuated floating lens mounting and curved, oversized variable image capturing zone sensor.

FIG. 9 depicts a cutaway side view of a sensor and camera motion management hardware of a system implementing aspects of the present invention, including a variably-actuated floating lens mounting 901 and curved oversized variable active zone sensor 903. A bi-convex converging lens 905 is seated in a lens bracket 907 with system- and/or user-variable, zoned electro-magnetic charge carrying attachments 909. As will be explained in greater detail below, individually chargeable zones, such as those shown as 908 of the attachments 909 permit the system to create magnetic and/or electrostatic holding and actuating forces with the use of variable actuators to accelerate and cause or cease the rotation of the lens assembly relative to the remainder of the system. Gyros, such as 910, may variably (applied when acceleration of the lens by the system is not sought) aid in stabilizing the lens/bracket assembly in space. Also mounted to bracket 907 are variable, actuable aperture controlling louvers 911, which limit the width and amount of light entering the camera/sensor hardware and, ultimately, landing on the sensor 903. The sensor 903 is shown to be curved such that, as lens 905 may rotate within an overall camera housing (not pictured) and relative to compatible zoned electromagnetic external actuator(s) 913, a focused image may still be captured on the sensor, albeit in a different, or even moving, expanse of the sensor 903 than before such rotation. Full rotation of the rotating lens/bracket assembly 901 such that image-forming light moves out of the sensor's range can be prevented by graduated rotation resisting force, implemented by the system, which may gradually create increasingly attractive, opposing accelerating charges in the charge carrying attachments 909 and nearby regions of the actuators 913. But the system and/or user may also use physical, such as retractable/extendable structural members, with or without force loading, to decelerate or arrest undesired lens movement, and, when floating lens aspects are not in use, to lock lens mounting 901 relative to the camera housing and/or sensor. In the instance of motion picture photography, the system may also follow and track rotation and other movement of the lens relative to the outside environment and momentarily arrest and then resume lens rotation and movement (including placing it into its correct position based on the previously projected rotation of the camera that would otherwise occur) to allow for a fixed image for the instance of recording on the sensor, avoiding motion blur, while maintaining a steady pan. Alternatively, motion blur can be corrected automatically by the system by tracking and interposing information from leading pixel/sensors outside of the image size, accepting light later the initial impression of light creating and image and determining shifted image data based on that advanced distance, and combining shifted or new pixel data with data from previously leading pixels and deleting that data from the actually recorded positions.

Preferably, the sensor 903 and the external lens actuator(s) 913 are connected structurally and weight-balanced, such that the mounting point for the actuator(s) serves as a fulcrum between them. In this way, less electromagnetic force is required to offset levered force that would occur between the external actuators and their own variable electromagnetic floating mount(s) actuator(s) 915.

The system may determine which region of the sensor 903 is considered active, and from which to accept and store image data, based on sensors indicating the rotational position of the lens, and then inferring the region which may accept light from the lens based on that rotation. Alternatively, the system may determine active regions on the sensor simply by the regions of light being sensed on the sensor 903, although dark conditions may limit the utility of that approach because no ambient light may be present for some regions of the sensor that should be dedicated to the image. In that instance, the system may select a variety of cropping options to the user, in specialized image file, to allow any composition chosen by the user. Communicating leads 917 permit computer or machine logic components (such as a computer system, like the system discussed with respect to FIG. 5) to actuate actuators 915 and 913, and apply force to lens 905, which may be graduated and user-selectably graduated, as with a multiple degree of depression sensing trigger or switch 921. In this way, a user holding a camera housing connected to actuators 915 and 913 and sensor 903 could gradually apply a force to the lens 905 to alter, accelerate, decelerate or arrest its rotation relative to the actuator(s) 915 and 913, sensor 903 and, more generally, their housing (not pictured).

Vertical or lateral shake can be avoided by the system by actuating additional chargeable regions of the floating mount actuator(s) 915, which may apply magnetic and/or electrostatic force to chargeable zones of the actuator 913. While generally similar charges lead the actuator to float, opposing, attractive charges at some paired locations may allow the system to hold, buffer or accelerate the actuators, according to user or system commands. For instance, if accelerometers indicate that the overall camera housing is initiating a vertical shake, and the user has commanded the system to "float" freely, without shake, the system may remove those opposing locking charges and initiate new opposing charges to accelerate the actuators (and the actuated lens) to move the peripheral components to the lens with the motion of the shake, and/or move the lens counter to the motion of the shake. Such commands may be made by varying degrees, using a variable degree input, such as a gradated trigger/sensor/switch like 921. Although, due to the cut-away nature of FIG. 4, it appears that the bottom of the actuator(s) 913 and its floating mount to the housing 915 are generally cylindrical, permitting only up and down movement, the actuator instead may be a single disk edge-shaped flange extending into a ring-shaped trench of the floating mount 915, controlling any lateral or vertical shake, and combinations thereof. Additional actuators (not pictured) using the same counter-motion systems may buffer shake in the fore and aft directions relative to the housing. Actuators, hardware input devices, and sensors of the system may communicate with one another and a control system, such as that discussed with reference to FIG. 5, via communication busses 917.

Figure 10:
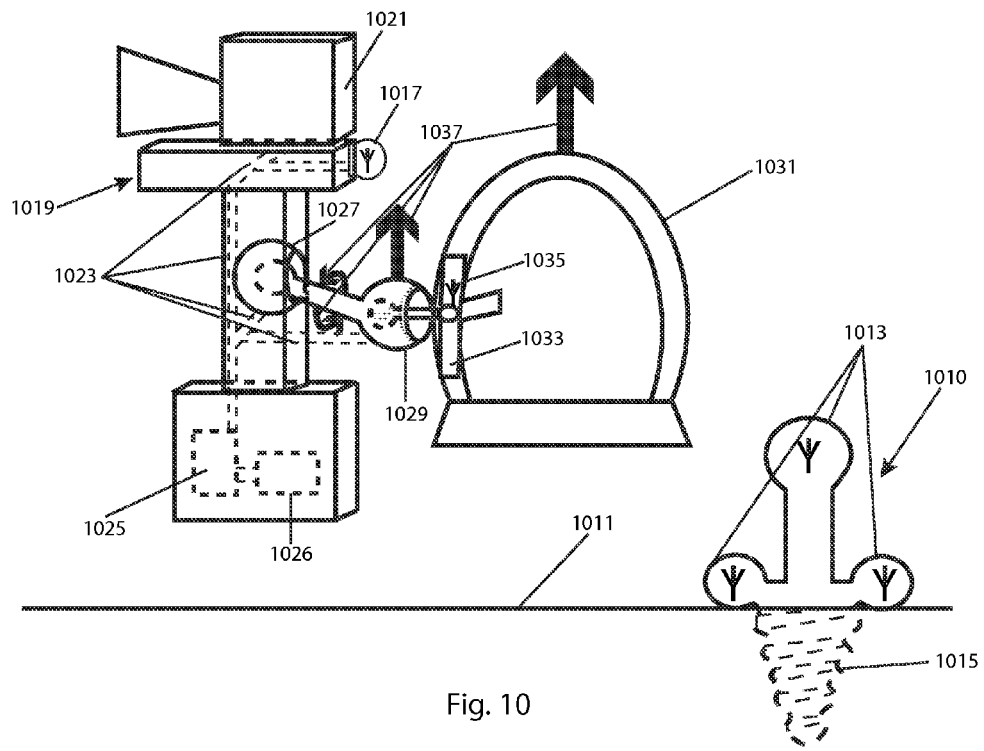
FIG. 10 depicts additional sensor and camera motion management hardware of a system implementing aspects of the present invention, including a local elevation and movement-indicating and response aspects.

FIG. 10 depicts additional sensor and camera motion management hardware of an exemplary system implementing aspects of the present invention, including a local elevation and movement-indicating beacon 1010, fixed into a ground or floor 1011. The movement-indicating beacon 1010 comprises multiple transmitting points 1013, at least some of which are located at different vertical and horizontal positions and transmit separately-identifiable, distance-indicating signals to the system, such that any movement in any direction relative to the beacon can be tracked and responded to by the system. An anchor section 1015 (which may include progressive threading, as pictured) permits pinning the beacon 1010 into a fixed (or desired to be tracked) background element, such as the ground or floor 1011. By receiving and/or transmitting distance-indicating signals over time, the transmitting points 1013 may indicate to the system, through, for example, RF antenna unit 1017, the initial and change in position of a sensor/camera support unit 1019, on which the sensor/camera 1021 is mounted. By communicating with elements of the sensor/camera 1021, lens assembly (not pictured in this figure) and RF antenna unit 1017 with leads/busses 1023, the computer system (such as a system similar to the one discussed with reference to FIG. 5) 1025, connected with and powered by a battery unit 1026, may aid in stabilizing the sensor/camera support unit 1019 by actuating and/or applying stabilizing force using electromagnetic stabilizer/actuators 1027 and 1029, in conjunction with a shoulder-mounted harness 1031 with torso-mounting bracket 1033. In addition to using free-floating isolation methods discussed with respect to FIG. 9, the system may stabilize the sensor/camera support unit 1019 by permitting the shoulder-mounted harness 1031 (which may alternatively be any form of harness or handle) to move in any direction and by any amount without applying direct force to the sensor/camera support unit. More specifically, the system detects and counters instantaneous movement of the shoulder-mounted harness (for instance, by location and/or movement data receipt/transmission of a mount beacon 1035 relative to each/any the movement indicating beacon 1010 and/or to the mount RF antenna unit 1017), from which movement information the location and additional force that would be instantaneously applied to stabilizer actuators 1027 and 1029 may be inferred by the system—preferably, detecting motions that lead with a mount beacon 1035 movement relative to the movement indicating beacon 1010, and countering them specifically or more aggressively than other movements with actuator movements that move with the direction of force. Instead of permitting the shoulder-mounted harness 1031, or a similarly-mounted and buffered operator handle (not pictured), to apply direct additional force (other than to counteract gravity or centrifugal forces, which may be detected separately by accelerometers in the camera mount 1019 as progressing from the gravitational direction to cause the camera mount to turn, and countered smoothly) the system may instead allow and assist both stabilizer actuator 1027 and 1029 joints to rotate, and provide the harness with freedom to move by moving an intermediate armature, which is actuated by both stabilizer actuators, while not moving mount 1019. Such a non-direct force transmitting movement, and reaction by the system, is shown by force arrows 1037. To allow a smoothly-applied redirecting force to be applied, the user may indicate that the system "follow" the relocation of the harness or handle by a degree of rapidness and closeness to the actual movements, or by movement progressions and functions, which may be variably set by the user. For instance, the system may apply a gradually, progressively increasing force in the same direction that the user has moved the harness, and a deceleration force that is also smooth and gradual, to permit a resting point that is the same relative to the shoulder harness as the beginning point, before the movement of the harness. Progressive functions that the system may apply may include force concentrations in different ranges of movement, and such functions may include, also as variably selectable by the user and system, restriction to movement in particular planes (e.g., "horizontal pan, faster acceleration curve in the first 30 degrees of harness pivot")

while preventing movement in other planes or lines (e.g., "fixed camera altitude"). The stabilizer actuator 1027 and 1029 may also be used by the system to resist and smooth out movements from external insult (e.g., nudging or panning the camera mount by hand) by similar counter movements and force biasing or smoothing functions.

Figure 11:
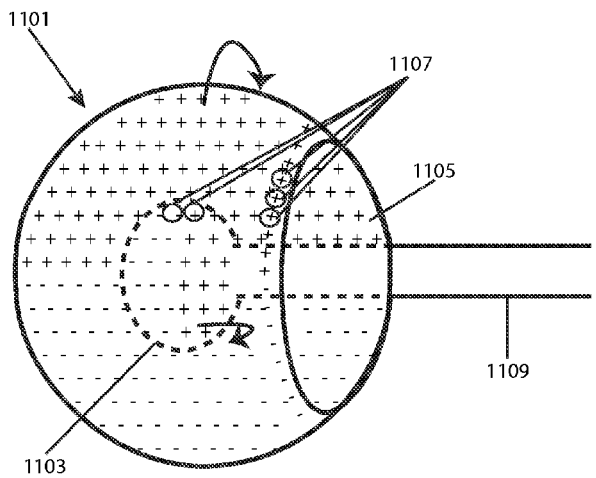
FIG. 11 depicts a potential electromagnetic stabilizer/actuator joint, as may be implemented in aspects of the present invention and, in particular, in the system discussed with respect to FIG. 10.

Turning to FIG. 11, certain additional aspects of the present invention involving potential forms of actuators 1027 and 1029 may be better understood. Generally, an actuator 1101 with a ball element 1103 and socket element 1105 is provided. Unlike with traditional ball-and-socket joints, however, 1101 may limit or avoid physical contact between the surfaces of the ball element 1103 and socket element 1105 by electromagnetic forces, which are sufficient to hold the ball element 1103 generally within the center of the socket element 1105. But contact, lubricants and ball bearing structures may alternatively be used. More specifically, separately chargeable regions, such as 1107, of both the ball element 1103 and the socket element 1105 may be variably electrically and magnetically charged to repel (or, as discussed in greater detail below, in particular regions to repel and attract) one another for both stability and applying rotational force to an attached lever 1109. One form of stabilization and actuation may be accomplished by rotating rotatable sphere aspects of either or both the ball element and the socket element (if provided with a rotatable axis where connected with other structural elements to which they are attached). By using a dipole of charges in both the ball element and the socket element, as shown (although the charge of the inner sphere of the 1103 sphere is shown and the charge of the outer sphere 1105 is not shown in the area where the two both appear in the figure, for clarity), and spinning them rapidly enough relative to one another, the resulting rapidly oppositely applied forces create a substantially fixed, stable hold between the two elements of the joint. Furthermore, by selectively slowing and accelerating the rotations at points to increase a particular direction of applied force, while increasing speed (and therefore, decreasing force), on the opposing side of the rotation, a force may be applied for a desired rotational direction and amount, or a function of directions and amounts, to cause actuation of the joint in any direction or functional complex of directions. By choosing more charge-bearing actuable units on the entirety of one side, as well as higher levels of charge, or less charge only toward the end of the side of the dipole, and differing rotational speeds, accelerations and decelerations, a wide variety of force gradations are possible. Rather than spinning fixed or fixed types of charges, charges may be simply altered in patterns to cause actuation as well, in fixed physical spheres for both the ball and socket components.

I claim:

1. A system for reducing undesired light and enhancing observable images comprising:
    hardware capable of defining a range of probable observation focal points; and
    hardware capable of selectively shading any of several tessellating regions of a semi-transparent matrix to shade or intercept at least some light rays that would otherwise converge at said probable observation focal points, the location of which may be variably set by the user(s) or system, which light rays transcend a threshold limit of luminance that would otherwise occur at said probable observation focal points based on overall ambient light information while, to an extent simultaneously possible while using the matrix as set forth above, leaving other light rays unshaded or less shaded by selectively shading or not shading at least one of several tessellating regions of a semi-transparent matrix,
    wherein the user may alter and/or calibrate the location of said shaded tessellating regions manually with a control indicating changes in the observation focal point(s), by adjusting an automobile's rear-view mirror or other display and/or seat position, due to the system exploiting the relationship between said mirror or said other display and/or seat position and the eye position of the user.

2. The system of claim 1, in which the user or system may add margins or tolerance zones of additional shading affecting observation focal point-destined light around said shaded regions of said semi-transparent matrix.

3. The system of claim 2, in which said margins or tolerance zones may be expanded, shifted or contracted by the user or system in reaction to live sensory and user control actuation data.

4. The system of claim 1, in which the system creates leading margins for said shaded tessellating regions of a semi-transparent matrix to intercept a probable movement of a brighter object that is the source of said light rays.

5. The system of claim 1, in which the system determines a probable movement of an object light source before shifting said shading of tessellating regions to intercept future light from said source.

6. The system of claim 1, in which the system reduces or augments at least part of said shaded tessellating regions based on potential danger posed by an object that would otherwise be blocked or otherwise reduced in the user's awareness due to said shaded tessellating regions.

7. The system of claim 6, in which the system creates an image enhancing the visibility of an object determined to pose a sufficient danger.

8. The system of claim 6, in which the system augments at least part of said matrix to deliver environmental and other information relevant to a user.

9. A system for reducing undesired light and enhancing observation comprising:
    hardware capable of defining a range of probable observation focal points and selectively implementing filtering in any of several area-filling regions of a semi-transparent matrix to reduce at least some effect of light that would otherwise converge at at least one probable observation focal point(s), the location of which may be variably set by the user(s) or system, which light transcends a threshold limit of characteristics from a light source that would otherwise occur at said at least one probable observation focal point(s) and so reduces at least some effect of said light to a degree necessary to reduce said light to, or below, said threshold limit, and wherein the system creates leading margins for said filtering to intercept a probable movement of a brighter object that is the source of said light.

10. The system of claim 9, in which the user or system may add margins or tolerance zones of additional filtering affecting observation focal point-destined light around said filtering of said semi-transparent matrix.

11. The system of claim 10, in which said margins or tolerance zones may be expanded, shifted or contracted by the user or system in reaction to live sensory and/or user control actuation data.

12. The system of claim 9, in which the user may alter and/or calibrate the location of said filtering manually with a control indicating changes in the observation focal point(s).

13. The system of claim 9, in which the system determines a probable movement of an object light source before shifting said filtering to intercept future light from said source.

14. A system for reducing undesired light and enhancing observable images comprising:

hardware capable of defining a range of probable observation focal points; and hardware capable of selectively shading any of several tessellating regions of a semi-transparent matrix to shade or intercept at least some light rays that would otherwise converge at said probable observation focal points, the location of which may be variably set by the user(s) or system, which light rays transcend a threshold limit of luminance that would otherwise occur at said probable observation focal points based on overall ambient light information while, to an extent simultaneously possible while using the matrix as set forth above, leaving other light rays unshaded or less shaded by selectively shading or not shading at least one of several tessellating regions of a semi-transparent matrix, wherein the system creates leading margins for said shaded tessellating regions of a semi-transparent matrix to intercept a probable movement of a brighter object that is the source of said light rays.

15. The system of claim 14, in which the user or system may add margins or tolerance zones of additional shading affecting observation focal point-destined light around said shaded regions of said semi-transparent matrix.

16. The system of claim 15, in which said margins or tolerance zones may be expanded, shifted or contracted by the user or system in reaction to live sensory and user control actuation data.

17. The system of claim 14, in which the user may alter and/or calibrate the location of said shaded tessellating regions manually with a control indicating changes in the observation focal point(s).

18. The system of claim 17, in which the user may so alter or calibrate the location of said shaded tessellating regions by adjusting an automobile's rear-view mirror or other display and/or seat position, due to the system exploiting the relationship between said mirror or said other display and/or seat position and the eye position of the user.

19. The system of claim 14, in which the system determines a probable movement of an object light source before shifting said shading of tessellating regions to intercept future light from said source.

20. The system of claim 14, in which the system reduces or augments at least part of said shaded tessellating regions based on potential danger posed by an object that would otherwise be blocked or otherwise reduced in the user's awareness due to said shaded tessellating regions.

21. The system of claim 20, in which the system creates an image enhancing the visibility of an object determined to pose a sufficient danger.

22. The system of claim 20, in which the system augments at least part of said matrix to deliver environmental and other information relevant to a user.

23. A system for reducing undesired light and enhancing observable images comprising:

hardware capable of defining a range of probable observation focal points; and hardware capable of selectively shading any of several tessellating regions of a semi-transparent matrix to shade or intercept at least some light rays that would otherwise converge at said probable observation focal points, the location of which may be variably set by the user(s) or system, which light rays transcend a threshold limit of luminance that would otherwise occur at said probable observation focal points based on overall ambient light information while, to an extent simultaneously possible while using the matrix as set forth above, leaving other light rays unshaded or less shaded by selectively shading or not shading at least one of several tessellating regions of a semi-transparent matrix, wherein the system determines a probable movement of an object light source before shifting said shading of tessellating regions to intercept future light from said source.

24. The system of claim 23, in which the user or system may add margins or tolerance zones of additional shading affecting observation focal point-destined light around said shaded regions of said semi-transparent matrix.

25. The system of claim 24, in which said margins or tolerance zones may be expanded, shifted or contracted by the user or system in reaction to live sensory and user control actuation data.

26. The system of claim 23, in which the user may alter and/or calibrate the location of said shaded tessellating regions manually with a control indicating changes in the observation focal point(s).

27. The system of claim 26, in which the user may so alter or calibrate the location of said shaded tessellating regions by adjusting an automobile's rear-view mirror or other display and/or seat position, due to the system exploiting the relationship between said mirror or said other display and/or seat position and the eye position of the user.

28. The system of claim 23, in which the system creates leading margins for said shaded tessellating regions of a semi-transparent matrix to intercept a probable movement of a brighter object that is the source of said light rays.

29. The system of claim 23, in which the system reduces or augments at least part of said shaded tessellating regions based on potential danger posed by an object that would otherwise be blocked or otherwise reduced in the user's awareness due to said shaded tessellating regions.

30. The system of claim 29, in which the system creates an image enhancing the visibility of an object determined to pose a sufficient danger.

31. The system of claim 29, in which the system augments at least part of said matrix to deliver environmental and other information relevant to a user.

32. A system for reducing undesired light and enhancing observation comprising:

hardware capable of defining a range of probable observation focal points and selectively implementing filtering in any of several area-filling regions of a semi-transparent matrix to reduce at least some effect of light that would otherwise converge at at least one probable observation focal point(s), the location of which may be variably set by the user(s) or system, which light transcends a threshold limit of characteristics from a light source that would otherwise occur at said at least one probable observation focal point(s) and so reduces at least some effect of said light to a degree necessary to reduce said light to, or below, said threshold limit, and wherein the system determines a probable movement of an object light source before shifting said filtering to intercept future light from said source.

33. The system of claim 32, in which the user or system may add margins or tolerance zones of additional filtering affecting observation focal point-destined light around said filtering of said semi-transparent matrix.

34. The system of claim 33, in which said margins or tolerance zones may be expanded, shifted or contracted by the user or system in reaction to live sensory and/or user control actuation data.

35. The system of claim 32, in which the user may alter and/or calibrate the location of said filtering manually with a control indicating changes in the observation focal point(s).

36. The system of claim 32, in which the system creates leading margins for said filtering to intercept a probable movement of a brighter object that is the source of said light.

\* \* \* \* \*